Aug. 16, 1927.  1,639,463
I. W. MILLER ET AL
CULTIVATOR
Filed June 2, 1926
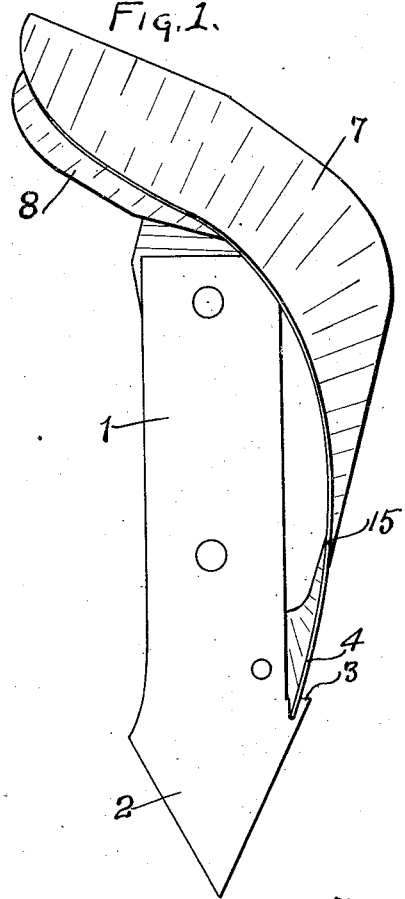
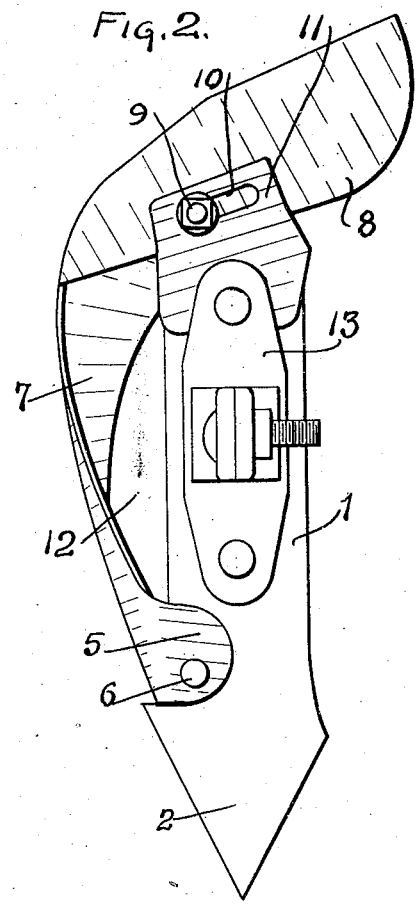
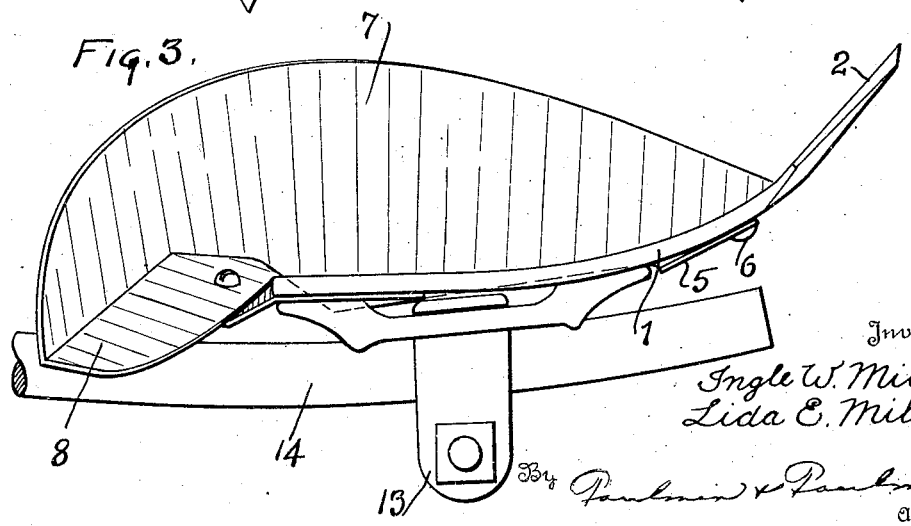
Inventors
Ingle W. Miller
Lida E. Miller
Attorneys Patented Aug. 16, 1927.

1,639,463

UNITED STATES PATENT OFFICE.

INGLE W. MILLER AND LIDA E. MILLER, OF DARKE COUNTY, OHIO.

CULTIVATOR.

Application filed June 2, 1926. Serial No. 113,290.

Our invention relates to cultivators and in particular to a guard for a cultivator tooth.

It is the object of our invention to provide a cultivator tooth having an adjustable guard which may be adjusted to regulate the flow of earth between the tooth and the guard and regulate the quantity of earth which is diverted laterally of the tooth and the quantity of trash which is so moved.

Referring to the drawing:

Figure 1 is a front elevation;

Figure 2 is a rear elevation; and

Figure 3 is a side elevation.

Referring to the drawings in detail, 1 is a cultivator tooth having the usual point 2 and a shoulder 3 on which rests the lower end of the guard designated 4. This end of the guard is pivoted through an ear 5 by a pivot 6 on the back of the cultivator tooth, whereas its forward portion 4 extends in front of the cultivator.

The guard proceeds upwardly and laterally across the top of the cultivator tooth in the form of a curved, overhanging guard generally designated 7. To this curved portion is attached a relatively vertical top guard portion 8. This top guard carries a bolt 9 which passes through a slot 10 of a bracket 11 carried on the top of the cultivator tooth 1.

This bracket 11 provided with the slot permits of the adjustment of the guard relative to the cultivator tooth so that the space between the guard and the tooth, designated 12, may be varied or entirely closed.

The cultivator tooth is supported in the usual manner through the bracket 13 and the arm 14.

It will be noted that our guard has a forwardly directed edge 15 which serves to cut the trash or divert it. It also cuts the earth, throwing to one side the desired quantity of earth or allowing the desired quantity to pass through the opening 12, or throws to the other side the desired quantity of earth.

It will be understood that we desire to comprehend within our invention such modifications as may be necessary to adapt it to varying conditions and uses.

Having thus fully described our invention, what we claim as new and desire to secure by Letters Patent, is:—

1. In combination, a cultivator tooth, a guard pivoted on the bottom thereof extending upwardly substantially parallel to the tooth and across the top thereof, and means to adjustably connect the top of the guard to the top of the tooth.

2. In combination, a cultivator tooth, a guard connected thereto at the bottom having its body substantially located at right angles to the face of the tooth at the lower portion thereof and transversely of the tooth at the upper portion thereof, and means to adjustably connect the upper portion of the guard with the tooth.

3. In combination, a cultivator tooth, a guard connected thereto at the bottom having its body substantially located at right angles to the face of the tooth at the lower portion thereof and transversely of the tooth at the upper portion thereof, and means to adjustably connect the upper portion of the guard with the tooth, and a back plate for said guard.

4. In combination, a cultivator tooth, a guard mounted thereon adapted to be spaced therefrom a portion of its length, said guard at its lower portion being directed substantially fore and aft of the tooth at right angles thereto and transversely of the tooth at the top thereof, said guard having a helical twist, and a back plate located on the rear edge of said guard at the top thereof transversely of said tooth, a bracket on said tooth, and means to adjustably connect said bracket and said back plate for adjustably positioning said guard.

In testimony whereof, we affix our signatures.

INGLE W. MILLER.
LIDA E. MILLER.